(No Model.)
F. S. TOMEY.
THERMOMETER.
No. 507,857. Patented Oct. 31, 1893.
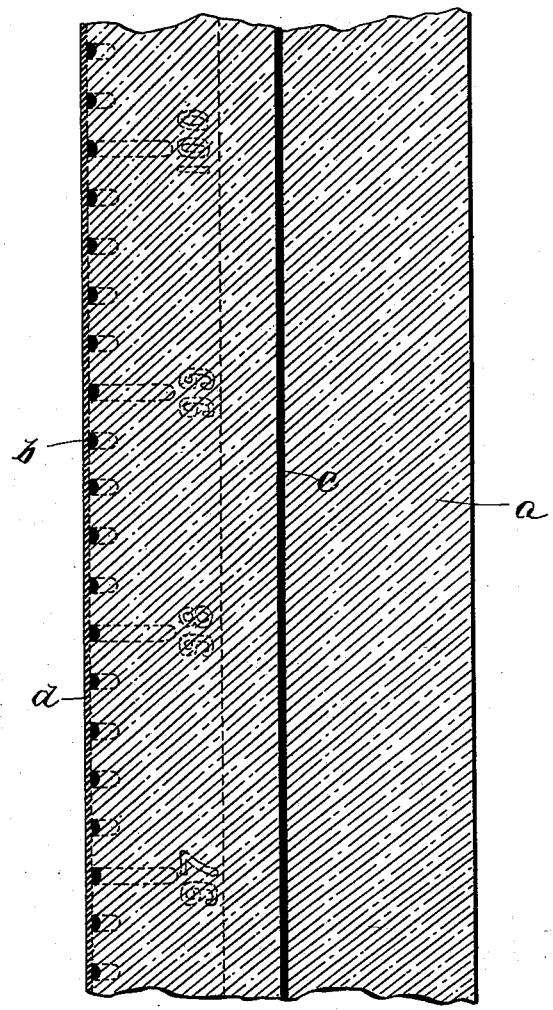
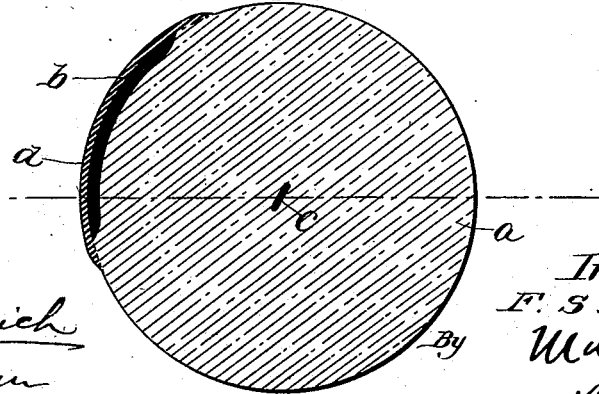
Witnesses:
Fred G. Dieterich
Jos. A. Ryan
Inventor:
F. S. Tomey
By Munn & Co.
Attorneys.

UNITED STATES PATENT OFFICE.

FRANCIS SAMUEL TOMEY, OF BIRMINGHAM, ENGLAND.

THERMOMETER.

SPECIFICATION forming part of Letters Patent No. 507,857, dated October 31, 1893.

Application filed April 10, 1893. Serial No. 469,840½. (No model.)

*To all whom it may concern:*

Be it known that I, FRANCIS SAMUEL TOMEY, glass-tube manufacturer, of 132 Park Road, Aston, Birmingham, England, have invented a new and useful Improvement in Thermometers, of which the following is a full, clear, and exact description.

When the divisions and figures which constitute the scale of a clinical, chemical, or other thermometer are marked externally on the front of the stem of the instrument in the ordinary way, they are very apt to be defaced and obliterated by the frequent cleaning and, in the case of a clinical thermometer, the disinfecting which it undergoes after use and by the action of the acids into which a chemical thermometer is frequently dipped in the course of its service. Moreover when the scale is applied on the front of the thermometer stem as usual, the height of the column cannot be so readily ascertained as when the scale is situated behind the column.

My invention has for its object to obviate these objections by providing the scale with a protective covering which answers the double purpose of a protector for the scale from the injury above referred to and of a backing to render the scale easily legible, the scale being applied to the rear of the stem so as not to obscure the column.

Reference is to be had to the accompanying drawings forming part of this specification wherein—

Figure 1 is a longitudinal section, of part of the stem of a clinical thermometer, and Fig. 2 is a cross section thereof, both drawn to a greatly magnified scale.

The same letters of reference denote like parts in both figures.

In carrying out my invention, I manufacture the thermometer in the ordinary manner except that the white enamel stripe which is at present usually drawn out and incorporated with the stem $a$ of the instrument is omitted. The graduation of the instrument is effected by "pointing" and the divisions $b$ and the corresponding figures of the scale are etched on the surface of the stem $a$ in the usual way, but instead of etching them on the front of the stem they are etched on the back in rear of the bore $c$ the form and position of the figures being such that they read the right way when viewed from the front through the stem. The graduations and figures so etched are then filled with ordinary black glass paint or enamel as now used for marking thermometer stems, after which I apply to the rear side of the stem which has been so graduated a stripe $d$ of fusible enamel or fusible glass paint and fuse the same by heat, say, in a carefully regulated oven or by the heat of a blow-pipe flame, taking care to prevent it spreading beyond the part to be covered and to avoid overheating. This coating fuses at a comparatively low temperature and is composed of ordinary powdered white enamel or glass paint mixed with the usual vehicle and is painted on in the usual manner of applying such enamel or paint and when fused it forms on cooling a hard smooth white stripe $d$, which resists acids (except of course hydrofluoric) and at the same time constitutes a backing by means of which the reading of the scale is facilitated. To prevent the bursting of the bulb of the thermometer during the operation of fusing on this enamel stripe, I form at the upper end of the stem a temporary chamber in communication with the bore and into which the indicating fluid is free to expand for the time being. Such a temporary expansion chamber is well known to makers of clinical thermometers as being employed during the operation of contracting the bore of the thermometer to prevent the mercury running back into the bulb.

I claim—

A chemical, clinical, or other thermometer having the rear side of its stem graduated and covered or backed by a protective stripe of fusible white glass paint or enamel fused on as herein specified.

Dated this 18th day of March, 1893.

FRANCIS SAMUEL TOMEY.

Witnesses:
 JAMES CLEWS,
257 *Victoria Road, Aston, Clerk.*
 WILLIAM JOSEPH GARDNER,
140ª *Frederick Road, Aston, Warehouseman.*